Figure 1:
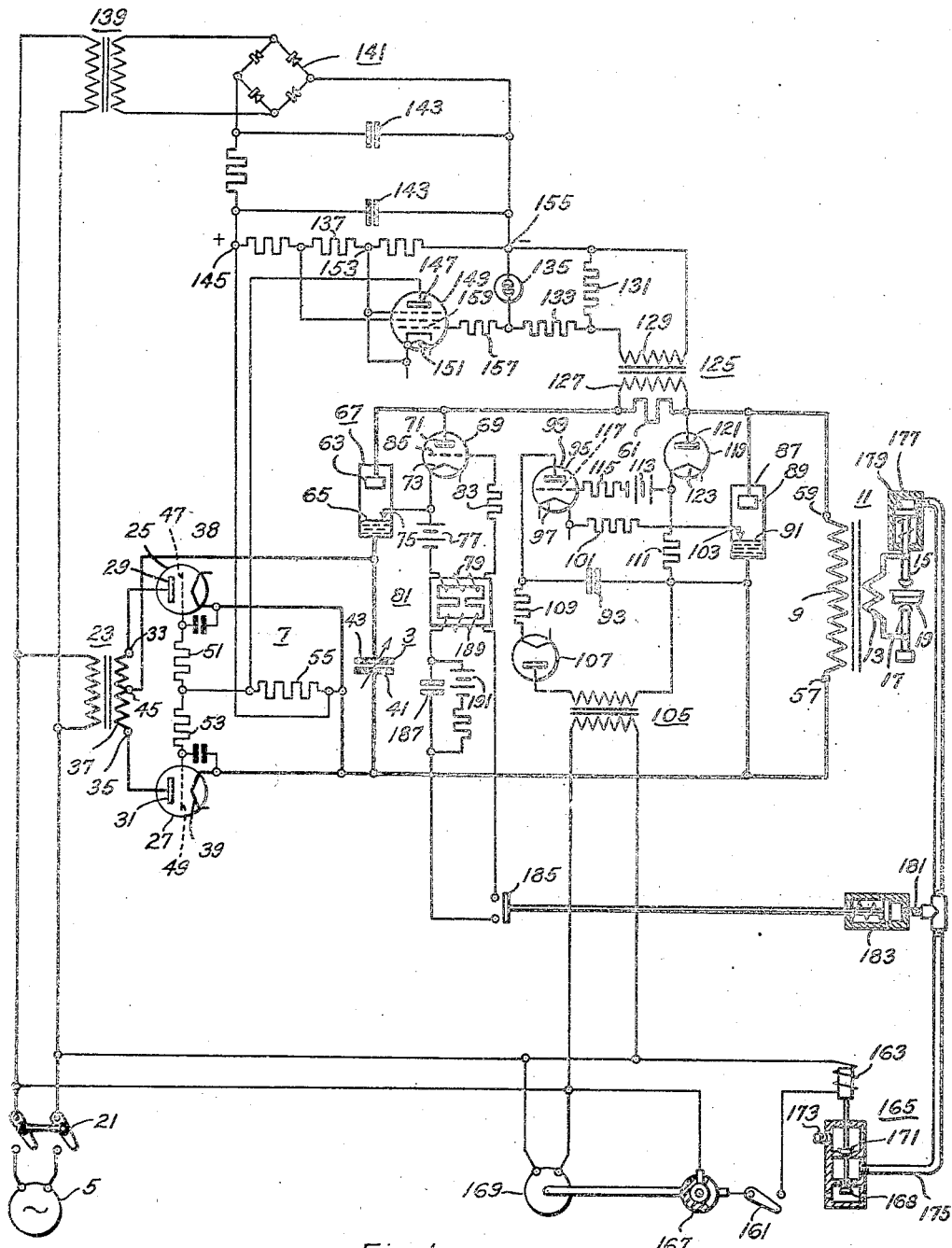

Patented July 30, 1946

2,404,971

UNITED STATES PATENT OFFICE 2,404,971

CONTROL CIRCUIT

John R. Mahoney, Pittsburgh, and Harry J. Bichsel, Forest Hills, Pa., assignors to Westinghouse Electric Corporation, East Pittsburgh, Pa., a corporation of Pennsylvania Application August 19, 1944, Serial No. 550,231

7 Claims. (Cl. 320—1)

This invention relates to an electronic control circuit and has particular relation to a control circuit for use with a capacitor discharge welder.

In an energy storage welder of the capacitor discharge type, a bank of capacitors is charged from an alternating current supply source through a rectifier and is thereafter discharged through the primary winding of a welding transformer, the secondary winding of which is connected across a pair of welding electrodes in engagement with the material to be welded. It has been common practice to control the discharge of the capacitor bank by means of an electric discharge valve of the arc-like type, such as an ignitron, connected in series with the primary winding of the welding transformer and the bank of capacitors. The series connected valve is rendered conductive by a timing circuit after the capacitor bank is charged to the desired voltage. When the series connected valve becomes conductive, the capacitor bank is discharged through the primary winding of the welding transformer to effect a weld.

As the discharge of the capacitor bank is completed, the energy stored in the magnetic core of the transformer and the secondary circuit during the discharge is released and tends to charge the capacitor bank inversely. To prevent such inverse charging of the capacitor bank, a second electric discharge valve of the arc-like type, preferably an ignitron, is connected in shunt across the primary winding of the welding transformer. The shunt connected valve is non-conductive during the original discharge of the capacitor bank but is rendered conductive when the energy stored in the transformer core and secondary circuit is released. The current resulting from the release of energy is shunted through the shunt connected valve and does not charge the capacitor bank inversely. Such an arrangement is shown, for example, in the copending application of Clyde E. Smith and Clarence B. Stadum, Serial No. 475,662, filed February 12, 1943.

In many applications of capacitor discharge welders, high speed operation is extremely desirable. For example, when a series of welds are to be made in rapid succession, correspondingly rapid charging and discharging of the capacitor bank is required. The rectifier employed to charge the capacitors in the bank is ordinarily arranged to supply charging current whenever the capacitor voltage is below a predetermined desired value. If the rectifier is in operation at the same time that the series connected valve is conductive, the current supplied through the rectifier for charging the capacitor, would instead be passed through the series connected valve preventing the latter from becoming non-conductive to enable a new weld to be made. It is therefore necessary to block the operation of the rectifier during the time that the series connected valve is conductive.

In the past, operation of the rectifier during discharge of the capacitor bank has been prevented by means of an auxiliary timing circuit which was connected to the rectifier circuit and became effective at the time the series connected valve was rendered conductive. The blocking time provided depended upon the voltage to which the capacitor bank had been charged. This arrangement is also shown in the aforementioned copending application of Smith and Stadum.

An auxiliary timing circuit as described to block the operation of the rectifier during the capacitor discharge operation is effective for that purpose. However, the actual length of the discharge time varies considerably for different transformers and different numbers and sizes of capacitors employed. In actual practice, the number of capacitors employed in the capacitor bank may be changed at will for different jobs. In addition, the control circuits may be applied to different welding transformers. Since the overall blocking time is substantially constant in the prior circuits for any capacitor voltage employed, the timing circuit must be arranged to give a blocking time of sufficient duration to take care of the longest discharge time. Such an arrangement obviously increases the overall time required for a welding operation in most cases and prevents the high speed successive welding operations desired.

It is accordingly an object of our invention to provide a new and improved control circuit for a capacitor discharge welder.

Another object of our invention is to provide a new and improved circuit for preventing charging of the capacitor bank during the normal discharge thereof in a capacitor discharge welder.

A further object of our invention is to provide a novel control circuit for a capacitor discharge welder in which the speed of operation is considerably increased.

In accordance with our invention the operation of the charging rectifier is prevented only in response to actual current flow through the valve means controlling the flow of current between the primary winding of the welding transformer and the capacitor bank. Thus, in a welder in which a series connected and a shunt connected valve are used as described, the rectifier is blocked only as long as the series connected valve is conductive. As soon as the series connected valve becomes nonconductive, recharging of the capacitor is initiated although current may still be flowing in the circuit through the primary winding of the welding transformer and the shunt connected valve. As a result the speed of operation of the welder may be greatly increased.

Figure 2:
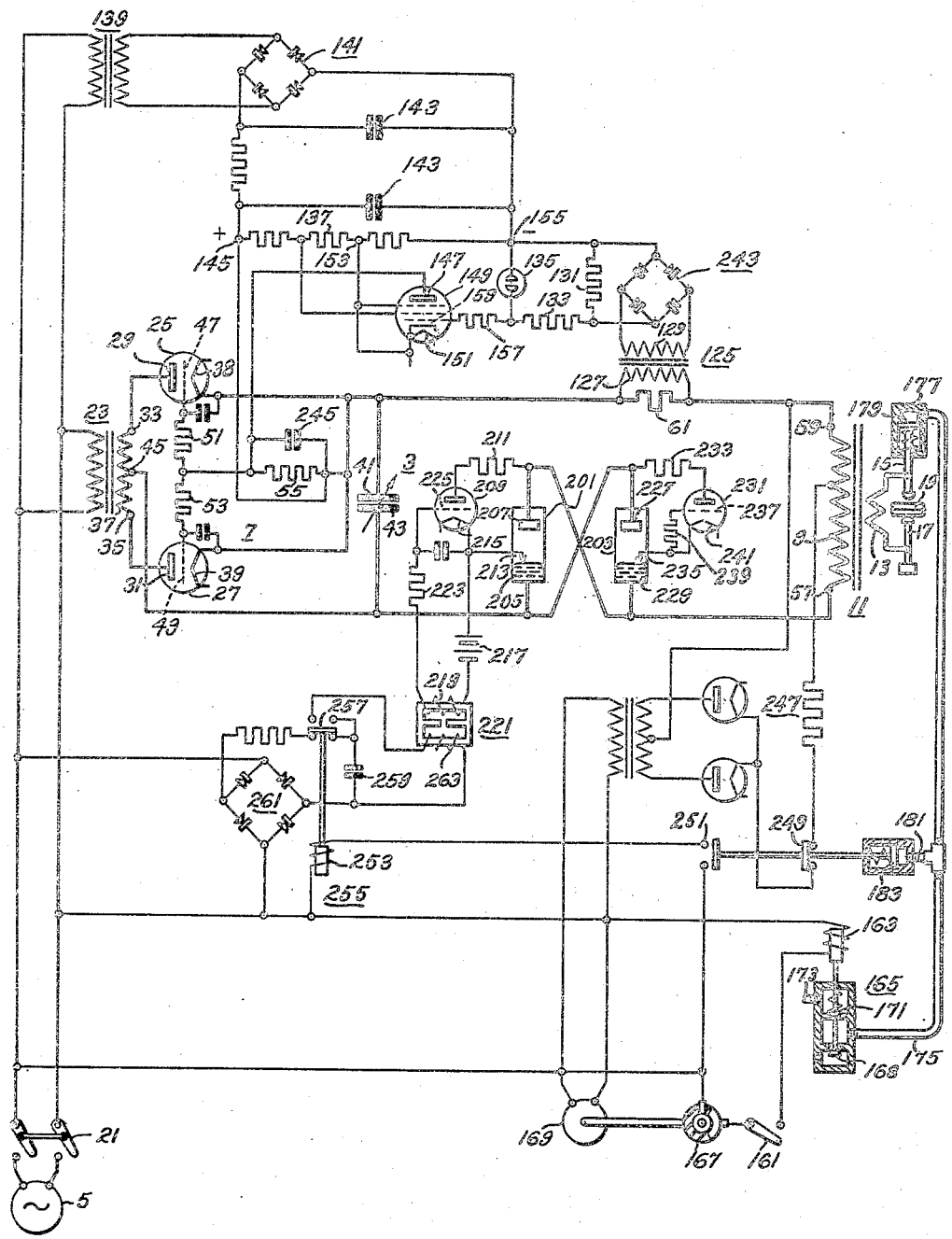

The novel features that we consider characteristic of our invention are set forth with particularity in the appended claims. The invention itself, however, both as to the organization and method of operation, together with additional objects and advantages thereof, will best be understood from the following description of specific embodiments when read in connection with the accompanying drawings, in which:

Figure 1 is a schematic diagram illustrating our invention as embodied in a capacitor discharge welder; and Fig. 2 is a schematic diagram illustrating our invention as embodied in a capacitor discharge welder of a different type.

As shown in Fig. 1 a variable capacitor 3 is connected to be charged from a source of alternating current 5 through a rectifier charging circuit 7 and to be discharged through the primary winding 9 of a welding transformer 11. The secondary winding 13 of the transformer 11 is connected across a pair of welding electrodes 15 and 17 which are adapted to be moved relative to each other to clamp the material 19 to be welded therebetween.

The charging circuit 7 receives its energy from the source 5 through a circuit breaker 21 and an auxiliary transformer 23. The charging circuit includes a pair of rectifier valves 25 and 27 of the arc-like type, preferably thyratrons, having their anodes 29 and 31, respectively connected to opposite end terminals 33 and 35 of the secondary winding 37 of the auxiliary transformer 23. The cathodes 38 and 39 of the valves 25 and 27, respectively, are connected to each other and to one plate 41 of the capacitor 3. The other plate 43 of the capacitor 3 is connected to a center tap 45 of the secondary winding 37. The grids 47 and 49, respectively, of the valves 25 and 27 are connected together through their respective grid resistors 51 and 53. The junction point between the grid resistors 51 and 53 is connected through another resistor 55 to the cathodes 37 and 39 of the valves 25 and 27. Consequently, the grids 47 and 49 are normally at the same potential as the corresponding cathodes 38 and 39. As a result, the charging circuit 7 constantly tends to supply direct current through the capacitor 3 to charge it to a predetermined value of voltage with the one plate 41 positive whenever the capacitor voltage is below the predetermined value. The value of the voltage is predetermined by the magnitude of the source voltage, the adjustment of the capacitor and the other circuit constants.

The positive plate 41 of the capacitor 3 is connected to one terminal 57 of the primary winding 9 of the welding transformer 11 with the other terminal 59 being connected to the other plate 43 of the capacitor 3 through a small resistor 61 and the anode 63 and cathode 65 of an electric discharge valve 67 of the arc-like type, such as an ignitron. Consequently, when the valve 67 becomes conductive, the capacitor 3 is discharged through the circuit including the primary winding 9, the resistor 61 and the valve 67.

An electric discharge valve 69 of the arc-like type such as a thyratron has its anode 71 connected to the anode 63 of the valve 67 and its cathode 73 connected to the ignition electrode 75 of the valve 67. Valve 69 is hereinafter designated as a firing valve. When the firing valve 69 is rendered conductive, current starts to flow in the circuit extending from the capacitor 3 through the primary winding 9, the resistor 61, the firing valve 69 and the ignition electrode 75 and cathode 65 of the valve 67 to the capacitor 3. This current renders the valve 67 conductive and the main discharge of the capacitor 3 is effected.

The control circuit of the firing valve 69 may be traced from the cathode 73 through a source of biasing potential such as a battery 77, the secondary winding 79 of a peaking transformer 81 and a grid resistor 83 to the grid 85 of the firing valve 69. The biasing potential supplied from the battery 77 normally maintains the firing valve 69 non-conductive to prevent discharge of the capacitor 3. However, a potential may be applied in the control circuit of the firing valve 69 through the peaking transformer 81 in a manner described hereinafter to render the firing valve 69 conductive.

When the capacitor 3 is discharged, the current flowing through the inductive primary winding 9 stores energy in the core of the welding transformer 11 as well as in the secondary winding circuit. As the discharge of the capacitor 3 is completed, the energy so stored is released tending to maintain the flow of current through the valve 67 to charge the capacitor 3 inversely with the plate 41 negative and the other plate 43 positive. To prevent this inverse charging, a second electric discharge valve 87 of the arc-like type, preferably an ignitron, is connected in shunt across the primary winding 9 and in parallel with the resistor 61, series connected valve 67 and capacitor 3. The anode 89 of the shunt connected valve 87 is, of course, connected to the same terminal 59 of the primary winding 9 as is the anode 63 of the series connected valve 67.

The firing circuit of the shunt connected valve 87 may be traced from the cathode 91 through a second capacitor 93, the anode 95 and cathode 97 of another electric discharge valve 99 (designated as a firing valve and preferably a thyratron) and a resistor 101 to the ignition electrode 103 of the shunt connected valve 87. The capacitor 93 is charged from the alternating current source through another auxiliary transformer 105, a rectifier 107 and a resistor 109. Consequently, when the second firing valve 99 is rendered conductive, the capacitor 93 is discharged through the ignition electrode 103 of the shunt connected valve 87 to render the latter conductive.

The control circuit of the second firing valve 99 may be traced from the cathode 97 through the resistor 101, the ignition electrode 103 and cathode 91 of the shunt connected valve 87, another resistor 111, a source of biasing potential such as a battery 113 and a grid resistor 115 to the grid 117 of the valve 99. The biasing potential normally maintains firing valve 99 non-conductive. Another rectifier valve 119 has its anode 121 connected to the anode 89 of the shunt valve 87 and its cathode 123 connected to the junction point between resistor 111 and battery 113. When the energy stored in the welding transformer and the secondary winding circuit is released, the polarity across the primary winding 9 changes and rectifier valve 119 becomes conductive. The current then flowing through rectifier valve 119 and resistor 111 develops a potential across resistor 111 to render firing valve 99 conductive to effect firing of the shunt connected valve 87. When the shunt connected valve 87 becomes conductive, the current flowing as a result of the release of energy at the primary winding 9 is conducted through the shunt valve. The series connected valve 67 becomes non-conductive at this time as the anode-cathode voltage thereof drops below the value necessary to maintain the arc therein.

Another auxiliary transformer 125 has its primary winding 127 connected across the small resistor 61 which is in circuit between the primary winding 9 and the series connected valve 67. The secondary winding 129 of the transformer 125 is connected across a resistor 131 which in turn is connected across another resistor 133 and a gas discharge tube such as a neon lamp 135. For reasons which will be set forth hereinafter, the transformer 125 is one having sufficient iron in its core and a sufficient number of turns so that it will not become substantially saturated under the conditions in which it is to be used, and will have a secondary winding output voltage of substantially the same wave form as the voltage impressed across its primary winding.

Direct current voltage is supplied across a voltage divider 137 from the alternating current source through a transformer 139, a full wave rectifier 141 and filtering capacitors 143. The positive terminal 145 of the divider 137 is connected through the resistor 55 in the grid to cathode circuit of the valves 25 and 27 in the charging circuit 7, to the anode 147 of an amplifier tube such as a pentode 149, an RCA 6-C-6 tube being satisfactory. The cathode 151 of the pentode 149 is connected to an intermediate point 153 of the divider 137, the negative terminal 155 of which is connected through the neon lamp 135 and a grid resistor 157 to the control grid 159 of the pentode. Thus, the magnitude of the current flowing through the pentode 149, and consequently through the resistor 55 in series therewith, depends upon the voltage across the neon lamp 135. When the voltage supplied from the auxiliary transformer 125 is low, the pentode 149 is substantially non-conductive and no voltage is developed across the resistor 55 by current flowing through the pentode circuit. When the voltage supplied from the transformer 125 is high, the pentode 149 is conductive and the current flowing therethrough develops a potential across the resistor 55 of such magnitude and polarity as to prevent the valves 25 and 27 in the charging circuit 7 from becoming conductive. In other words, when the pentode 149 is conductive, the charging circuit 7 is prevented from operating.

The neon lamp 135 serves to limit the maximum positive voltage on the grid 159 of the pentode 149 without disturbing the wave form of the voltage supplied from the secondary winding 129 of the transformer 125 during the very first and very last parts of the discharge of capacitor 3. It is only by having the wave form of the voltage developed across the secondary winding substantially the same as the wave form impressed across the primary winding that it is possible to effect removal of the blocking potential from the charging circuit at the proper time.

In operating the welder illustrated in Fig. 1, the circuit breaker 21 is first closed. The capacitor 3 is then charged through the rectifier valves 25 and 27 until it reaches a predetermined maximum voltage. A hand switch 161 may then be closed completing a circuit from one terminal of the source through the coil 163 of a solenoid valve 165, the hand switch 161 and a commutator 167 to the other terminal of the source. The commutator 167 is provided with conductive and non-conductive sections arranged to effect an opening and a closing of the circuit at timed intervals for a predetermined period of time. The commutator may be driven by a synchronous motor 169 which is energized from the source. It is to be noted that the commutator 167 is merely illustrative of a repetitive timer and other timing means may be employed in place of the commutator. In actual practice electronic circuits such as is disclosed in the copending application of Pearson and Faulk, Serial No. 442,939, filed May 14, 1942, now Patent No. 2,354,140 dated July 18, 1944, are often used for this purpose.

When the commutator 167 completes the circuit through the coil 163 of the solenoid valve 165, the lower valve member 168 is closed and the upper valve member 171 is opened, completing a hydraulic circuit from an inlet pipe 173 to an outlet pipe 175. The outlet pipe 175 leads to a cylinder 177 containing a spring biased piston 179 to which one of the electrodes 15 is secured. Hydraulic pressure forces this piston 179 downward until the electrodes 15 and 17 engage the material 19 to be welded. Thereafter, the back pressure in the hydraulic system operates through another pipe 181 to move another spring biased piston 183 to the left as illustrated in the drawings. Movement of the second piston 183 to the left closes a contactor 185 to complete a circuit from a capacitor 187 through the contactor 185 and the primary winding 189 of the peaking transformer 81, the secondary winding 79 of which is in the control circuit of the first firing valve 69. The capacitor 187 has been previously charged from a source of direct current potential such as a battery 191, connected thereacross. Thus, when the contactor 185 completes the circuit, the capacitor 187 discharges through the peaking transformer 81 which impresses a potential in the first firing valve control circuit sufficient to render that valve conductive and fire the series connected valve 67.

When the series connected valve 67 becomes conductive, the main capacitor 3 is discharged through the primary winding 9, the small resistor 61 and the series connected valve 67 to effect a weld. Current flowing through the resistor 61 acts through the auxiliary transformer 125 to impress a potential in the control circuit of the pentode 149 causing the latter to become conductive. So long as the pentode 149 remains conductive, current flowing through the resistor 55 in circuit therewith develops a potential across the resistor 55 which prevents the valves 25 and 27 in the charging circuit of the capacitor 3 from conducting any current to the capacitor 3 or to the discharge circuit therefor.

It is to be noted that the only current through the resistor 61 is that which passes through the series connected valve 67. This current is but a single unidirectional impulse. In addition, the voltage developed across the resistor 61 is often too low to be used directly in an electronic control since, in most cases, the resistor 61 must be quite small to avoid appreciable effect in the discharge circuit. For these reasons an auxiliary transformer 125 is used in which the voltage across the secondary winding has the same wave form as the voltage across the primary winding. Such a transformer insures the impressing in the input circuit of the pentode 149 of a potential to maintain the pentode conductive substantially until the series connected valve 67 becomes non-conductive.

As the initial discharge of the capacitor 3 through the primary winding 9 of the welding transformer 11 is completed, the stored energy is released tending to maintain the flow of current through the series connected valve 67 to charge the capacitor 3 inversely. However, at that time the rectifier valve 119 becomes conductive causing the second firing valve 99 to render the shunt connected valve 87 conductive. The shunt connected valve 87 then conducts the entire current resulting from the release of stored energy so that the series connected valve 67 becomes non-conductive. At that instant the pentode 149 also becomes non-conductive and recharging of the capacitor 3 is initiated.

After the capacitor 3 is discharged, the commutator 167 opens the circuit through the coil 163 of the solenoid valve 165 permitting the piston 183 to be moved to open the contactor 185 in the firing circuit of the first firing valve 69 and permitting the electrode 15 to be moved out of engagement with the work 19 so that the work may be repositioned for a new weld. After a time interval sufficient for the capacitor 3 to be recharged the commutator 167 again completes the circuit through the operating coil 163 of the solenoid valve 165 and another weld is initiated.

In Fig. 2 is illustrated a similar blocking circuit as applied to a different kind of capacitor discharge welder. This welder is known as the full cycle welder and is disclosed and claimed in the copending application of Ezra T. Hughes and Stephen L. Burgwin, Serial No. 511,575, filed November 24, 1943. Here, the capacitor 3 is again charged from an alternating current source 5 through the same kind of a charging circuit 7 as was described in connection with Fig. 1 and the same reference characters are employed to designate corresponding elements.

The positive plate 41 of the capacitor 3 is connected through the small resistor 61 to one side 59 of the primary winding 9 of the welding transformer 11. The other side 57 of the primary winding 9 is connected to the other plate 43 of the capacitor 3 through a pair of inversely connected valves 201 and 203, preferably ignitrons. The cathode 205 of the first valve 201 is connected to the negative plate 43 of the capacitor 3 and the anode 207 is connected to the positive plate 41 through the primary winding 9 and resistor 61.

An electric discharge valve 209 of the arc-like type, preferably a thyratron, which is hereinafter designated as a firing valve, is connected in series with a current limiting resistor 211 between the anode 207 and ignition electrode 213 of the first valve 201. When the firing valve 209 is rendered conductive, current starts to flow in the circuit extending from the positive plate 41 of the capacitor 3 through the resistor 61, the primary winding 9, the current limiting resistor 211, the firing valve 209, the ignition electrode 213 and cathode 205 of the first valve 201 to the other plate 43 of the capacitor. This ignition current renders the first valve 201 conductive and the main discharge of the capacitor 3 through the primary winding 9 and the first valve 201 is effected.

The control circuit of the firing valve 209 may be traced from its cathode 215 through a source of biasing potential such as a battery 217, the secondary winding 219 of a peaking transformer 221 and a grid resistor 223 to the grid 225 of the firing valve. The biasing potential supplied from the battery 217 normally maintains the firing valve 209 non-conductive to prevent discharge of the capacitor 3. However, a potential may be impressed in the control circuit of the firing valve through the peaking transformer 221 in a manner described hereinafter to render the firing valve conductive, resulting in a discharge of the capacitor 3 through the primary winding 9 and valve 201.

As previously mentioned, the capacitor 3 is originally charged with one plate 41 positive and the other plate 43 negative. When the capacitor 3 is discharged, the discharge current flowing through the primary winding 9 stores energy in the welding transformer and the secondary circuit. As the discharge of the capacitor is completed, the energy so stored is released causing the capacitor to be charged inversely with plate 43 positive and plate 41 negative. The anode 227 of the second valve 203 is connected to the plate 43 while its cathode 229 is connected through the primary winding 9 and resistor 61 to the plate 41. Consequently, if the second valve 203 is then rendered conductive, the inverse charge on the capacitor 3 is discharged through the valve 203, the primary winding 9 and resistor 61.

Another electric discharge valve 231 of the arc-like type, preferably a thyratron, and also designated as a firing valve, is connected in series with a current limiting resistor 233 between the anode 227 and the ignition electrode 235 of the second valve 203. The grid 237 of firing valve 231 is connected through a grid resistor 239 to the cathode 241 of the firing valve. Consequently, when the resultant potential in the circuit consisting of the capacitor 3, the primary winding 9, resistor 61 and the valves 201 and 203, has the opposite polarity from the original charge on the capacitor, the firing valve 231 becomes conductive to render the second valve 203 conductive.

An auxiliary transformer 125 is also provided with its primary winding 127 connected across the small resistor 61 in the discharge circuit of the capacitor 3 and its secondary winding 129 connected to supply a control voltage for the pentode amplifier tube 149, the output circuit of which is arranged to develop a potential across the resistor 55 to prevent operation of the charging circuit 7 while the pentode 149 is conductive. This blocking circuit is similar to the one described in connection with Fig. 1 but in addition a full wave rectifier 243 is interposed between the secondary winding 129 of the auxiliary transformer 125 and the resistor 131. This full wave rectifier 243 is necessary in this circuit because current flows through the resistor 61 in both directions during the discharging operations of the capacitor 3. Another capacitor 245 is also connected across the resistor 55 in the output circuit of the pentode 149 to prevent too rapid a response to a decrease in potential across the resistor 61. In this way the momentary decrease in voltage across the resistor 61 as the current therethrough passes through zero during the discharging operation does not affect the blocking of the charging circuit 7.

A flux resetting circuit 247 is provided for reasons set forth in the aforesaid Hughes and Burgwin application. This circuit effects a flow of direct current through a portion of the primary winding 9 as long as contactor 249 is closed. Contactor 249 is operated by pressure responsive piston 183 and is open during welding operations and closed between successive operations.

When the circuit breaker 21 in Fig. 2 is first closed, the capacitor 3 is charged in the usual manner to the preselected voltage. To initiate a welding operation the hand switch 161 is then closed causing the hydraulic system to move electrodes 15 and 17 into engagement with the material 19 when commutator 167 completes the circuit. The hydraulic system moves piston 183 to the left, opening contactor 249 to open the flux resetting circuit 247 and closing a second contactor 251 to complete a circuit from the source through the coil 253 of a relay 255. The contactor 257 on the relay 255 in its deenergized position completes a charging circuit for an auxiliary capacitor 259 from a direct current source 261. When the relay 255 is energized, the charging circuit is opened and the contactor 257 closes a discharge circuit for the capacitor 259 through the primary winding 253 of the peaking transformer 221, the secondary winding of which is in the control circuit of the first firing valve 209. As a result the first valve 201 is rendered conductive and the main capacitor 3 is discharged through the primary winding 9 of the welding transformer 11. The capacitor 3 thereafter receives an inverse charge before the current through the first valve 201 drops to zero. At that time the second valve 203 is rendered conductive and the inverse charge on the capacitor 3 is discharged back through the primary winding 9. During the period of conductivity of the first and second valves 201 and 203, current is flowing through the resistor 61 in series therewith which acts through the auxiliary transformer 125 and the pentode 149 to prevent operation of the charging circuit 7 for the main capacitor 3. As soon as the second valve 203 becomes non-conductive the blocking potential on the charging circuit 7 is removed and recharging of the capacitor 3 by the charging circuit is initiated.

It is to be noted that while the initial discharge of the capacitor 3 through the first valve 201 is sufficient to produce a weld, the subsequent discharge of the inverse charge on the capacitor is not sufficient to effect welding. The discharge of the inverse charge on the capacitor does, however, act to return the flux of the welding transformer a considerable way toward its original state, enabling the welding electrodes to be opened immediately thereafter without danger of arcing at the tips of the electrodes. Moreover, the portion of the inverse charge which is not employed in resetting the flux is again stored in the capacitor with the original polarity so that it is not wasted. The many advantages of such full cycle operation is fully set forth in the aforementioned copending application of Hughes and Burgwin.

Following the discharging operation the commutator 167 opens the circuit through the solenoid valve 165 causing the electrodes 15 and 17 to be opened, the flux resetting circuit to be reclosed and the relay 255 to be deenergized. After a time period during which the capacitors 3 and 259 are recharged, the commutator again completes the circuit through the solenoid valve and another welding operation is initiated.

Although we have shown and described a specific embodiment of our invention, we are aware that modifications thereof may be made without departure from the inventive concept here disclosed. We do not intend, therefore, to limit our invention to the specific embodiments described and illustrated.

We claim as our invention:

1. Apparatus for use in supplying current to a load comprising a capacitor, charging means connected across said capacitor and tending to supply current therethrough to charge the same whenever the capacitor voltage is below a predetermined value, circuit means connecting said capacitor across said load to effect discharge of said capacitor therethrough, said circuit means including valve means interposed between said capacitor and load for controlling the flow of current therebetween and impedance means in series with said valve means whereby a voltage is developed across said impedance means in response to current conducted through said valve means, means responsive to said voltage and connected to said charging means for preventing operation of said charging means only during current flow through said valve means, and control means connected to said valve means to cause said valve means to be conductive during each of a plurality of spaced intervals.

2. Apparatus for use in supplying current to a load comprising a capacitor, charging means connected across said capacitor and tending to supply current therethrough to charge the same whenever the capacitor voltage is below a predetermined value, circuit means connecting said capacitor across said load to effect discharge of said capacitor therethrough, said circuit means including valve means interposed between said capacitor and load for controlling the flow of current therebetween and a resistor in series with said valve means through which passes only the current conducted through said valve means, control means connected to said valve means to cause said valve means to be conductive during each of a plurality of spaced intervals, and means connected to said resistor and to said charging means and responsive to the potential developed across said resistor by a flow of current therethrough to prevent operation of said charging means only during such current flow.

3. Apparatus for use in supplying current to a load comprising a capacitor, charging means connected across said capacitor and tending to supply current therethrough to charge the same whenever the capacitor potential is below a predetermined value, circuit means connecting said capacitor across said load to effect discharge of said capacitor therethrough, said circuit means including valve means interposed between said capacitor and load for controlling the flow of current therebetween and a resistor in series with said valve means through which passes only the current conducted through said valve means, control means connected to said valve means to cause said valve means to be conductive during each of a plurality of spaced intervals, a transformer having a primary and a secondary winding with the primary winding connected in circuit across said resistor, said transformer being of the type in which the wave-form of the voltage across the secondary winding is substantially the same as that of the voltage across the primary winding, and means connected to said secondary winding for preventing operation of said charging means only while said valve means is conductive and in response to the voltage developed across said resistor by a flow of current therethrough.

4. Apparatus for use in supplying current to a load comprising a capacitor, charging means connected across said capacitor and tending to supply current therethrough to charge the same whenever the capacitor potential is below a predetermined value, circuit means connecting said capacitor across said load to effect discharge of said capacitor therethrough, said circuit means including valve means interposed between said capacitor and load for controlling the flow of current therebetween and a resistor in series with said valve means through which passes only the current conducted through said valve means, control means connected to said valve means to cause said valve means to be conductive during each of a plurality of spaced intervals, a transformer having a primary and a secondary winding with the primary winding connected in circuit across said resistor, said transformer being of the type in which the wave-form of the voltage across the secondary winding is the same as that of the voltage across the primary winding, said charging means including second control means responsive to the impressing thereon of a direct current voltage of a predetermined polarity and minimum magnitude to prevent operation of said charging means, and means including an amplifier having an input circuit supplied from said secondary winding for impressing a direct current voltage of at least said predetermined minimum magnitude and of said polarity on said second control means throughout substantially the entire interval of current flow through said resistor.

5. Apparatus for use in supplying current to an inductive load comprising a capacitor, charging means connected across said capacitor and tending to supply current therethrough to charge the same with a predetermined polarity whenever the capacitor potential is below a preselected value, circuit means connecting said capacitor across said load including a first electric discharge valve of the arc-like type interposed between said capacitor and load for controlling the discharge of said capacitor through said load, control means connected to said first valve to render it conductive at spaced intervals, a second electric discharge valve of the arc-like type connected in parallel circuit relation to said capacitor and first valve, and means connected to said second valve and to said load to render said second valve conductive following each discharge of said capacitor to conduct current resulting from a release of the energy stored in said load during the discharge, said circuit means also including impedance means in series with said first valve and said parallel connected second valve and load whereby a voltage is developed across said impedance means by current passing though said first valve, and means responsive to said voltage and connected to said charging means to prevent operation thereof only while said voltage is present.

6. Apparatus for use in supplying current to a load through a magnetic core transformer having primary and second windings with said secondary winding being connected in circuit with said load, comprising a capacitor, means connected across said capacitor to supply charging current therethrough whenever the capacitor potential is below a predetermined value, means including normally non-conductive valve means connecting said capacitor in circuit across said primary winding whereby an oscillating current tends to flow through said primary winding when said valve means is conductive, control means connected to said valve means for rendering the same conductive at spaced intervals to permit a full cycle of oscillating current to flow through said primary winding, impedance means in series with said valve means whereby a voltage is developed across said impedance means by current conducted through said valve means, and means responsive to said voltage and connected to said charging means for preventing operation of said charging means only while valve means is conductive.

7. Apparatus for use in supplying current to a load through a magnetic core transformer having primary and secondary windings with said secondary winding being connected in circuit with said load, comprising a capacitor, means connected across said capacitor to supply charging current therethrough whenever the capacitor potential is below a predetermined value, means including normally non-conductive valve means connecting said capacitor in circuit across said primary winding whereby an oscillating current tends to flow through said primary winding when said valve means is conductive, control means connected to said valve means for rendering the same conductive at spaced intervals to permit a single cycle of oscillating current to flow through said primary winding, a resistor in series with said valve means, a second transformer having a primary and a secondary winding with the primary winding connected in circuit across said resistor, said second transformer being of the type in which the wave form of the voltage across the secondary winding is the same as that of the primary winding voltage, said charging means including second control means responsive to the impressing thereon of a direct current voltage of a predetermined minimum magnitude and polarity to prevent operation of said charging means, and means including a rectifier connected across the secondary winding of said second transformer and an amplifier supplied from said rectifier for impressing a direct current voltage of at least said predetermined minimum magnitude and said polarity on said control means throughout substantially all said single cycle of oscillating current.

JOHN R. MAHONEY.
HARRY J. BICHSEL.